(12) United States Patent
Girardin et al.

(10) Patent No.: US 7,637,705 B2
(45) Date of Patent: Dec. 29, 2009

(54) TRACK FITTING WITH VISUAL INDICIA OF ENGAGEMENT

(75) Inventors: Jean-Marc Girardin, Golden Beach, FL (US); Joe Esteireiro, Miramar, FL (US); Roger Dick, Hollywood, FL (US)

(73) Assignee: Valeda Company, Fort Lauderdale, FL (US)

( * ) Notice: Subject to any disclaimer, the term of this patent is extended or adjusted under 35 U.S.C. 154(b) by 271 days.

(21) Appl. No.: 11/236,964

(22) Filed: Sep. 27, 2005

(65) Prior Publication Data

US 2006/0104740 A1 May 18, 2006

Related U.S. Application Data

(63) Continuation-in-part of application No. 11/182,027, filed on Jul. 15, 2005, now abandoned, which is a continuation of application No. 10/787,944, filed on Feb. 27, 2004, now Pat. No. 6,918,722.

(51) Int. Cl.
*B60P 7/08* (2006.01)
(52) U.S. Cl. .............................. 410/105; 410/8; 410/104
(58) Field of Classification Search ........................ 410/8, 410/104, 105; 244/118.1; 248/503, 503.1
See application file for complete search history.

(56) References Cited

U.S. PATENT DOCUMENTS

| | | | |
|---|---|---|---|
| 4,019,752 A | 4/1977 | Leon et al. |
| 4,047,689 A | 9/1977 | Grendahl |
| 4,103,934 A | 8/1978 | Arnholt et al. |
| 4,213,636 A | 7/1980 | King |
| 4,369,995 A | 1/1983 | Harder, Jr. |
| 4,449,875 A | 5/1984 | Brunelle |
| 4,496,271 A | 1/1985 | Spinosa et al. |
| 4,623,289 A | 11/1986 | Apostolos |
| 4,688,843 A | 8/1987 | Hall |
| 4,690,364 A | 9/1987 | Constantin |
| 4,771,969 A | 9/1988 | Dowd |
| 4,796,837 A | 1/1989 | Dowd |
| 4,805,954 A | 2/1989 | Lazaroff |
| 4,850,769 A | 7/1989 | Matthews |
| 4,877,361 A | 10/1989 | DeRosa et al. |
| 4,930,808 A | 6/1990 | Mikoll et al. |
| 4,948,311 A | 8/1990 | St. Pierre et al. |
| 5,026,225 A | 6/1991 | McIntyre |

(Continued)

FOREIGN PATENT DOCUMENTS

GB     1179042 A     1/1970

(Continued)

*Primary Examiner*—Stephen Gordon
(74) *Attorney, Agent, or Firm*—Baker & McKenzie LLP; David I. Roche; Daniel A. Tallitsch

(57) ABSTRACT

A track fitting with a spring loaded plunger for use in securing an anchor to a floor track mounted in a vehicle. The track fitting includes an anchor with at least one engaging lug, preferably on each side of the anchor, and a spring loaded plunger with at least one post, preferably one on each side of the plunger, that is registered to a lug to lock the anchor into the floor track when the fitting. The fitting includes visual indicia to signal an installer that the plunger is at least approximately in the locked position.

3 Claims, 10 Drawing Sheets

U.S. PATENT DOCUMENTS

| | | | |
|---|---|---|---|
| 5,180,263 A | 1/1993 | Flowers, Jr. |
| 5,302,065 A | 4/1994 | Vogg et al. |
| 5,337,979 A | 8/1994 | Bales et al. |
| 5,391,030 A | 2/1995 | Lee |
| 5,489,172 A | 2/1996 | Michler |
| 5,499,844 A | 3/1996 | Dirck |
| 5,529,341 A | 6/1996 | Hartigan |
| 5,628,595 A | 5/1997 | Harris |
| 5,738,471 A | 4/1998 | Zentner et al. |
| 5,762,296 A | 6/1998 | Gilbert |
| 5,779,271 A | 7/1998 | Dorow et al. |
| 5,823,727 A | 10/1998 | Lee |
| 5,833,267 A | 11/1998 | Cordes et al. |
| 5,839,757 A | 11/1998 | von Lange et al. |
| 5,871,318 A | 2/1999 | Dixon et al. |
| 5,971,433 A | 10/1999 | Ament et al. |
| 5,975,822 A | 11/1999 | Ruff |
| 6,039,520 A | 3/2000 | Cheng |
| 6,059,313 A | 5/2000 | Coogan et al. |
| 6,142,718 A | 11/2000 | Kroll |
| 6,149,359 A | 11/2000 | Cardona |
| 6,183,178 B1 | 2/2001 | Bateman |
| 6,186,545 B1 | 2/2001 | Corbett |
| 6,213,696 B1 | 4/2001 | Austin |
| 6,231,283 B1 | 5/2001 | Stowers |
| 6,287,060 B1 | 9/2001 | Girardin |
| 6,349,986 B1 | 2/2002 | Seel et al. |
| 6,350,089 B1 | 2/2002 | Tekavec |
| 6,361,238 B1 | 3/2002 | Schittl et al. |
| 6,474,916 B2 | 11/2002 | Constantin |
| 6,524,039 B1 | 2/2003 | Magnuson et al. |
| 6,685,403 B2 | 2/2004 | Constantin |
| 6,899,497 B2 | 5/2005 | Cadona et al. |
| 6,918,722 B1 * | 7/2005 | Girardin .................... 410/105 |
| 2002/0064433 A1 | 5/2002 | Constantin |
| 2003/0012617 A1 | 1/2003 | Constantin |

FOREIGN PATENT DOCUMENTS

| | | |
|---|---|---|
| GB | 2411429 A | 8/2005 |
| GB | 2417520 A | 1/2006 |
| GB | 2430466 A | 3/2007 |
| WO | WO 01/28811 A1 | 4/2001 |

* cited by examiner

TRACK FITTING WITH VISUAL INDICIA OF ENGAGEMENT

This is a continuation-in-part of U.S. application Ser. No. 11/182,027, filed Jul. 15, 2005, now abandoned, which is continuation of U.S. application Ser. No. 10/787,944, filed Feb. 27, 2004, now U.S. Pat. No. 6,918,722, issued Jul. 19, 2005.

BACKGROUND AND SUMMARY

The inventions described herein relate to wheelchair restraint systems and more particularly to improved spring-loaded track fittings for rapidly and safely securing a device to a floor track in a vehicle.

Conventionally, buses and vans equipped to carry wheelchairs and the like are provided with a pair of parallel slotted floor channel-shaped tracks into which one or more anchors can be inserted. Each track has a series of spaced-apart circular openings. Between the openings the open upper side of the channel-shaped track narrows. Anchors are designed with lugs extending laterally from the lower part of the anchor. The lugs fit through the openings in the track, and the anchor is moved such that the lugs lie underneath the narrowed potions of the upper side of the channel-shaped track to prevent removal of the anchor from the track. The anchors are and tracks are designed so that the anchor may secured at any selected position along the length of the track. Such anchors include a spring-loaded plunger, the lower end of which contains a post that passes through spaced-apart openings in the track to keep the lugs in alignment with the narrowed portions of the upper side of the track. Upon release of the spring, the sides of the plunger engage with the track at any selected position.

While such fittings are generally effective they are not without their disadvantages. Any asymmetry can result in a moment or leverage such that forces applied to the fitting during a sudden deceleration or crash situation, can cause bending or twisting of the fitting or of the track itself so that the fitting jams in the track and no longer slides freely within the track. There is a need, therefore, for an improved track fitting that spreads the applied load along a longer length of the fitting and track so as to prevent or at least minimize such bending or twisting of the fitting and/or the track. In addition, if the posts on the plunger do not properly engage the openings in the track, the anchor can accidentally disengage from the track. Since the anchor is typically very close to or at ground level, it is sometime difficult to see whether the anchor and plunger have properly engaged the openings in the track.

One of several objects of the system described herein is to provide a track plunger fitting that has easily seen indicia to confirm to the installer that an anchor is properly engaged in a track.

Yet another one of several objects of the system described herein is to provide an anchor that engages a plurality of adjacent holes in a conventional floor track so as to eliminate or reduce any twisting action on the fitting. In order to accommodate a dual plungers without increasing the overall height of the device, a split plunger with overlapping heads may be employed.

By one aspect of the system described herein there is provided a track fitting comprising an anchor with at least one track engaging lug extending from a lower part of the anchor; a plunger carried by the anchor, the plunger having at least one post; the plunger being moveable between an extended position and a retracted position; the plunger in the retracted position allowing insertion and translation of the lug of the anchor in a track; the plunger in the extended position being such that the at least one post is in registration with an opening in the track to restrict translation of the anchor and restrict removal of the anchor from the track; and visual indicia on an outer portion of the fitting defining a visual confirmation that the plunger is at least approximately in its extended position locking the anchor in the track.

DETAILED DESCRIPTION

Figure 1:
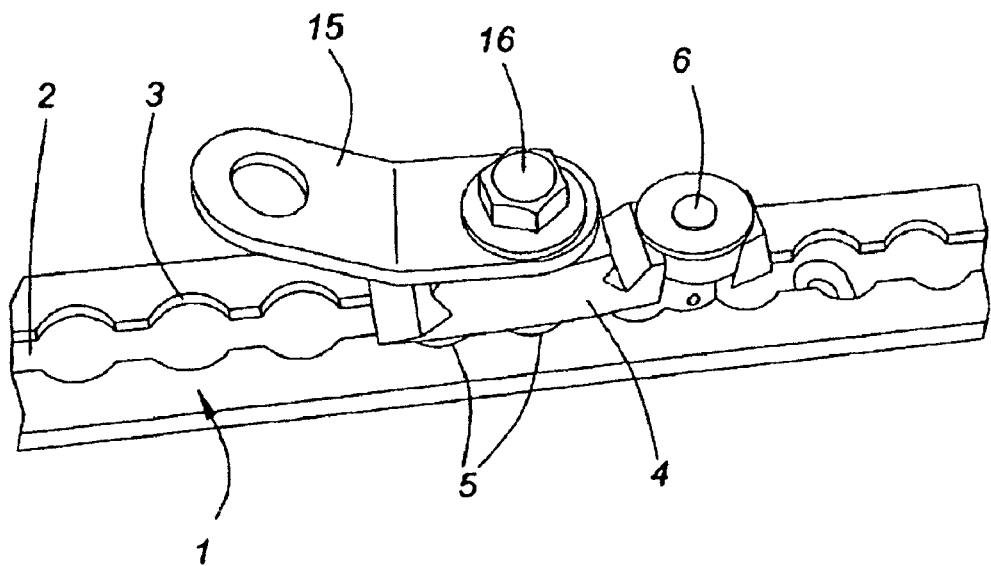
FIG. 1 is an isometric view of a plunger type track fitting according to the prior art and provided with a single plunger.

In FIG. 1 there is shown a conventional floor track 1, generally formed from extruded aluminum and provided with a C-shaped track 2 and a plurality of slots 3, uniformly spaced along the length thereof. A die cast or forged metal track fitting 4 having a pair of outwardly extending lugs 5, which can be inserted in any adjacent pair of slots 3, and so that the tops of the lugs 5 engage the underside of the C-shaped section of track 2, is locked into any selected position along the length thereof by means of a spring loaded plunger 6 which engages a selected slot 3. It will be appreciated that the fitting is relatively short and only two lugs on each side engage with the track so that there is some tendency to twist when a load is applied upwardly, which can occur in an emergency crash or stop situation.

Figure 2:
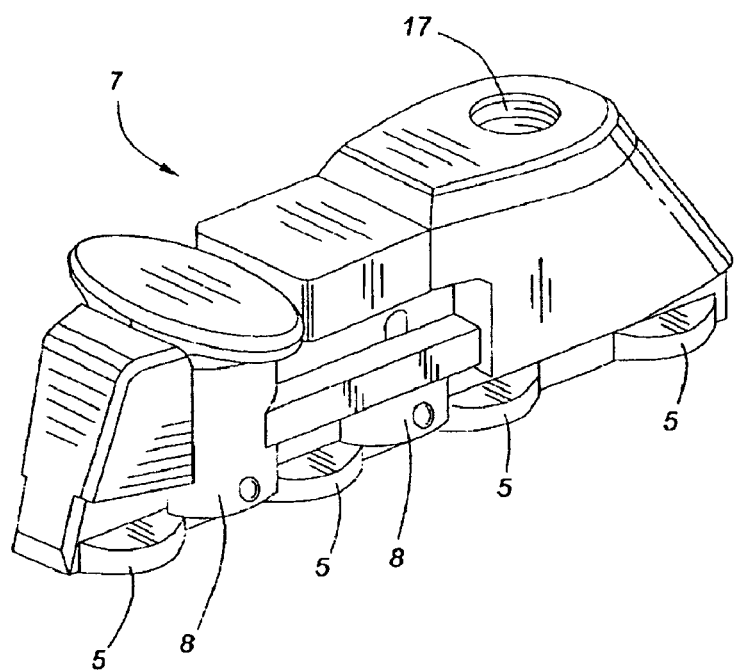
FIG. 2 is an isometric view of one embodiment of the track fitting and double plunger.
Figure 3:
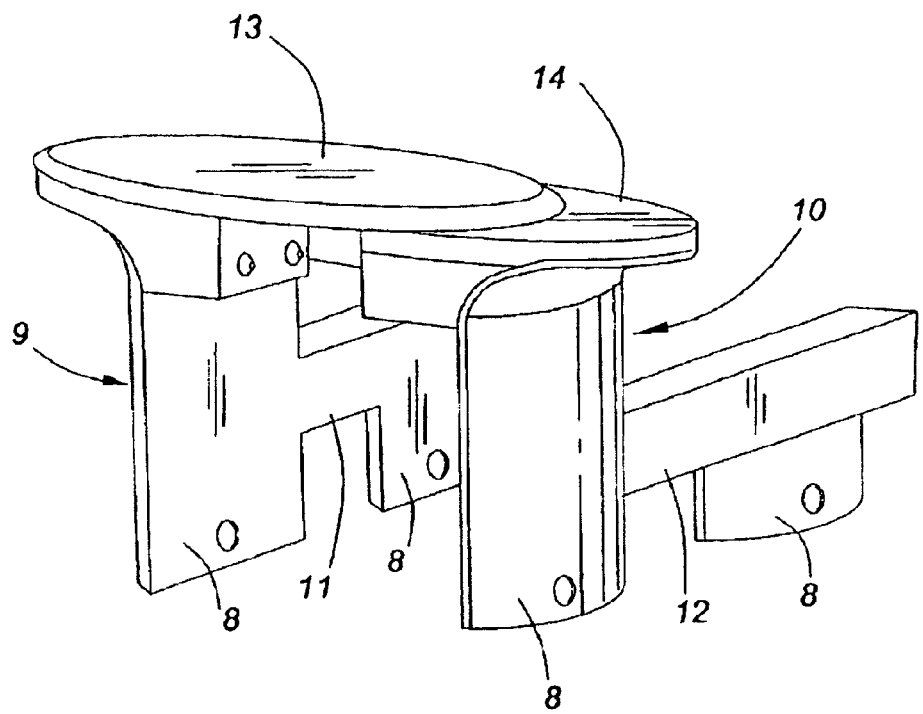
FIG. 3 is an isometric enlarged view of the plunger of the embodiment of FIG. 2.
Figure 4:
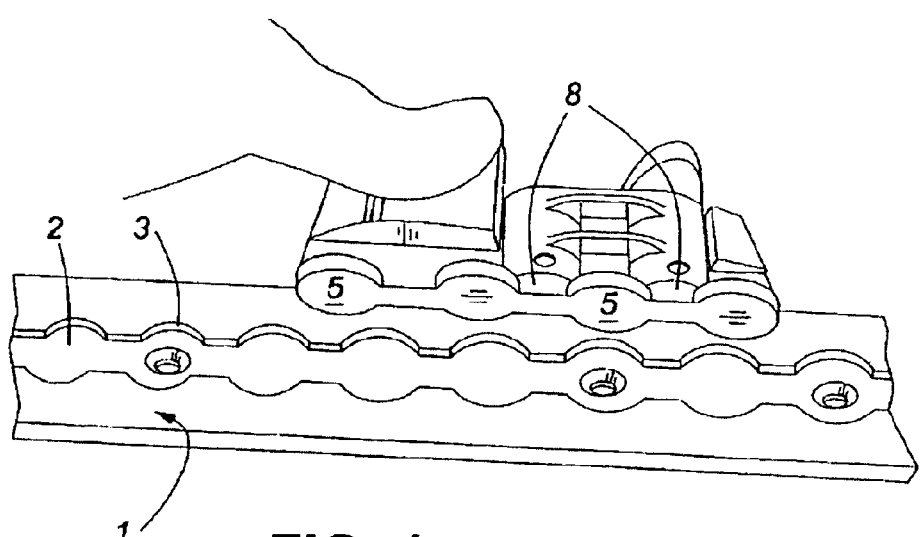
FIG. 4 is an isometric view of the plunger of FIG. 2 as inserted into a floor track.

In FIG. 2 there is shown a track fitting 7 according to one embodiment described herein which is designed so that four lugs 5 can be inserted into four adjacent slots 3 in a conventional floor track 2, and translated or shifted until two spring loaded plungers 8 drop into a pair of adjacent slots 3 on each side of the track 2, as seen most clearly in FIG. 4. It will be appreciated that, as lugs 5 are inserted into slots 3, the lower surfaces of plungers 8 engage the top surface of the track 1, the internal compression springs (not shown) therein are compressed when the lugs 5 are fully inserted in the slots 3, the fitting 7 can then slide along the track 2 until the plungers 8 are exactly located over an adjacent pair of slots 3, whereupon the compressed springs force the plungers 8 downwardly into the slots 3, thereby locking the fitting 4 securely in a selected position along the track 1. Usually, but not essentially, the plungers 8 are fabricated in any conventional thermoplastic or thermosetting plastic material, such as glass filled nylon or similar abrasion resistant material. For ease of manufacture, it has been found preferable to make the plungers 8 in two parts 9, 10, each having a pair of plungers 8 in spaced longitudinal alignment to each other, and interconnected by a side body member 11, 12 respectively. Each part 9, 10 is provided with a substantially oval shaped planar finger grip 13, 14, in overlying relationship to each other, as shown in FIGS. 2 and 3. In order to release the fitting 4 from track 1, upward finger pressure is applied to grips 13, 14 to raise the plungers 8 out of their respective slots 3 so that fitting 4 can slide along track 1 until the lugs 5 are aligned with an adjacent pair of slots 3 and the fitting 4 can be removed from the track. Because the track fittings of FIG. 1 is generally considerably longer than that of the prior art, there is far less tendency for the fitting 4 to twist and bind in the track 1.

It will, of course, be appreciated that a strap engaging lug 15 may be secured by a bolt 16 (as seen in FIG. 1) insertable in threaded bore 17 (FIG. 2) in conventional manner.

Figure 5:
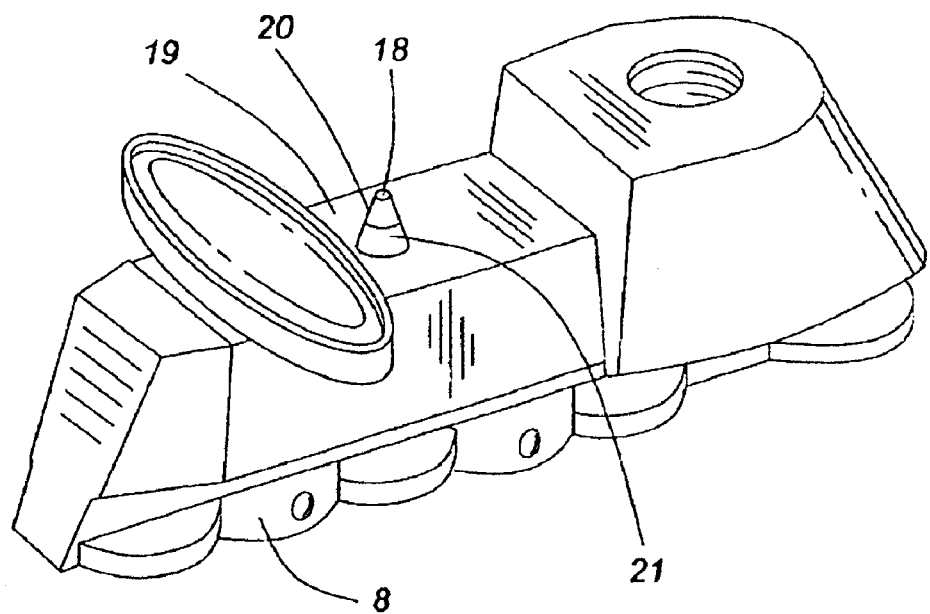
FIG. 5 is an isometric view of the embodiment of FIG. 2 incorporating one type of visual indicia of engagement.

It has also been found that, in the event dirt enters the track or a track bolt is loose, the plungers 8 may appear to be locked in place but are in fact not securely locked and it is possible that, in the event of a sudden stop or accident, the track fitting will separate from the track thereby releasing the restraint system to the danger of the wheelchair passenger. It is advisable, therefore, that the the double plunger system should also incorporate a visual indicator to show that the plungers 8 are in the fully locked position. One such indicator 18 is shown in FIG. 5 and comprises a multi-coloured pin which extends through a cover 19 on plungers 8. The top of the pin 18 may be coloured, say red on the top and along part of the sides 20 thereof, but green along the lower sides 21 thereof. The green lower portions are, of course, only visible when the plungers 8 are fully engaged and locked in place on the track.

Figure 6:
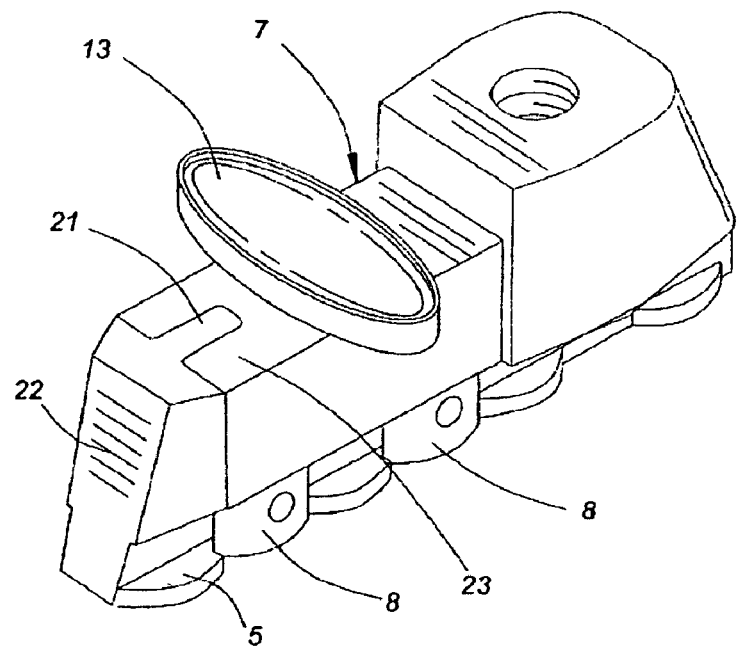
FIG. 6 is an isometric view, similar to FIG. 5, showing alternative indicia.

In FIG. 6 there is shown an alternative embodiment of the visual indicator described with reference to FIG. 5. Track fitting 7 is provided with finger grips 13, 14, plungers 8 and lugs 5 as in other embodiments, and the rear of fitting 7 is provided with a finger 21, forming part of the housing 22 of fitting 7, and extending longitudinally into a cover 23 forming part of finger grips 13, 14, such that when the plungers 8 are in the fully depressed and locked position, the top surface of finger 21 is flush with the top surface of cover 23. It will be appreciated that if plungers 8 are not fully locked, then the surface of cover 23 will be above the surface of finger 21 and the difference therebetween will provide a clear visual indication that the fingers are not locked.

Figure 7:
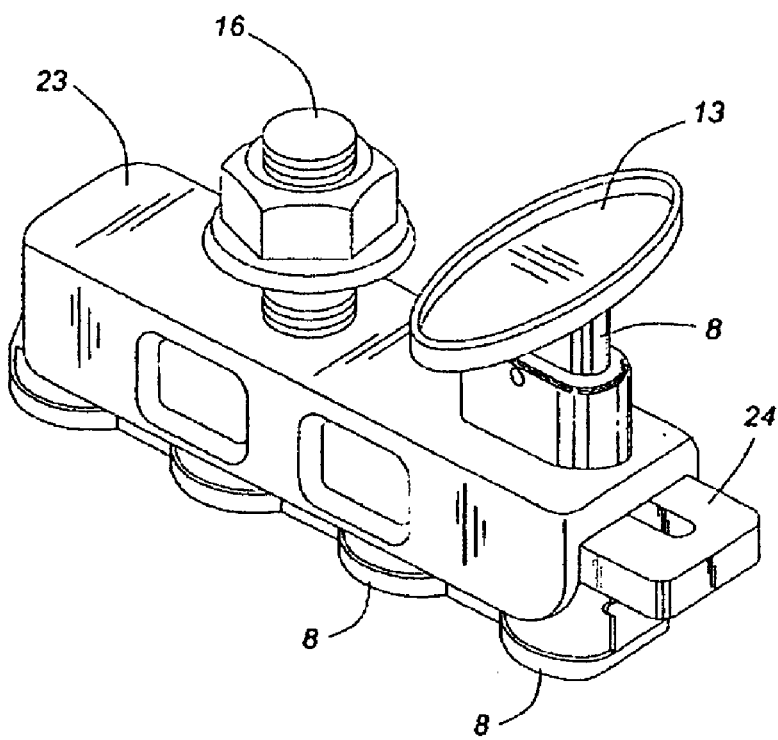
FIG. 7 is an isometric view of the embodiment of FIG. 2, in the unlocked position, incorporating a slide mechanism to lock the plungers.
Figure 8:
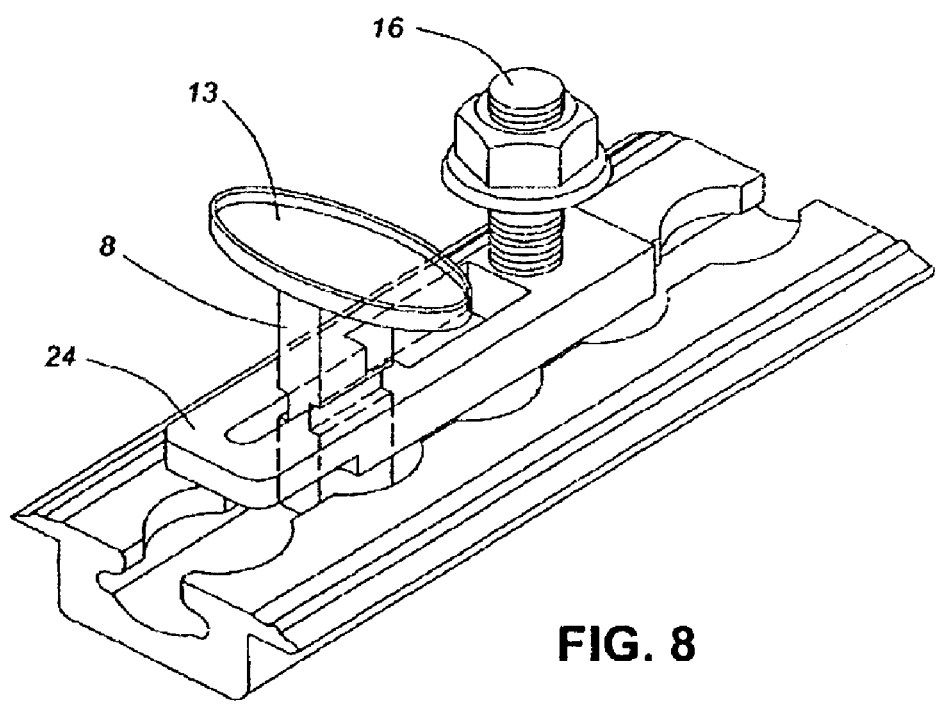
FIG. 8 is an internal view of FIG. 7 illustrating the slide mechanism.
Figure 9:
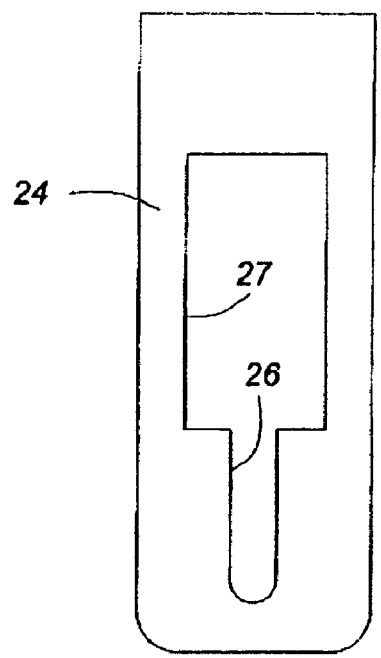
FIG. 9 is a plan view of the slide of FIG. 8.
Figure 10:
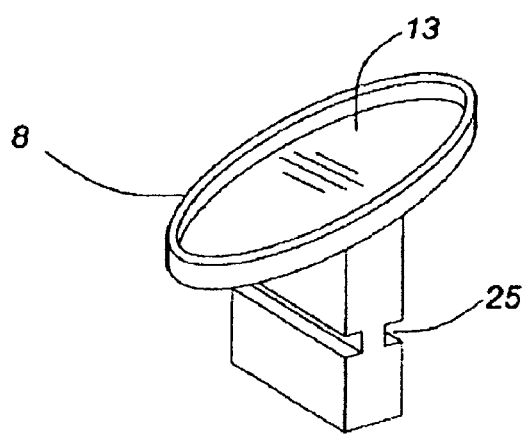
FIG. 10 is an enlarged view of the plunger of FIG. 8.

In some circumstances it may also be desirable to provide a visual indication of locking and to secure the plungers in the locked position by a positive locking mechanism. One such lock is illustrated in FIGS. 7 and 8, in which the pin 18 and finger 21 of FIGS. 5 and 6 are replaced by a slide 24, projecting rearwardly from the cover 23 and movable from an extended unlocked position, shown in FIG. 7, to a closed locked position (not shown) in which the slide engages plungers 8 so as to hold them in the locked position and prevent lifting of finger grips 13, 14 until the lock slide 24 is extended rearwardly. As seen more clearly in FIG. 9, slide 24 is provided with a narrow slot 26 which engages in slot 25 in the plungers 8 and a wider slot 27 which disengages from slot 25 when the slide 24 is pulled outwardly to the unlocked position.

Figure 11:
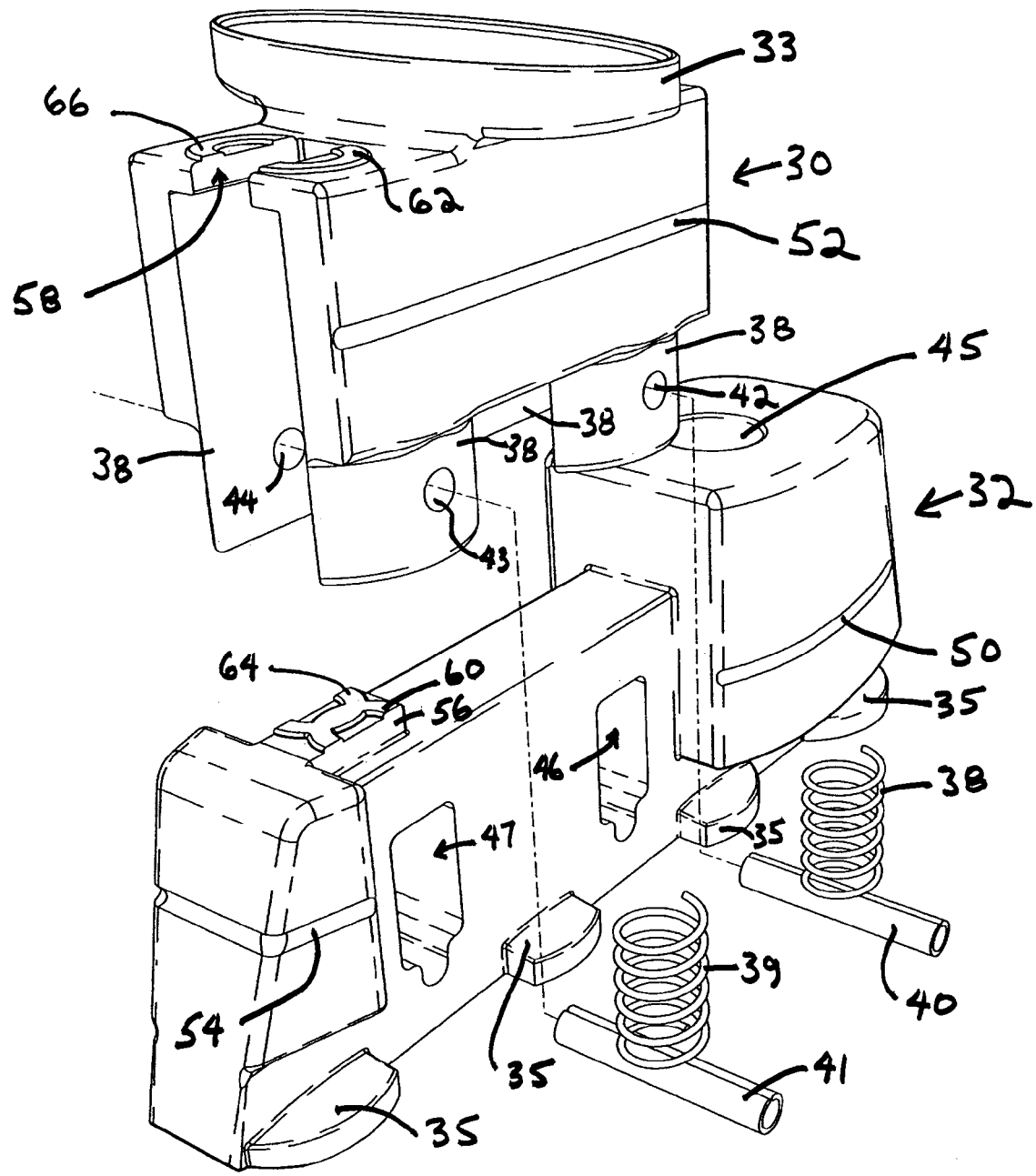
FIG. 11 is an exploded isometric view of an embodiment of a track fitting with visual indicia in the form of complementary geometric shapes on the plunger and the anchor.
Figure 12:
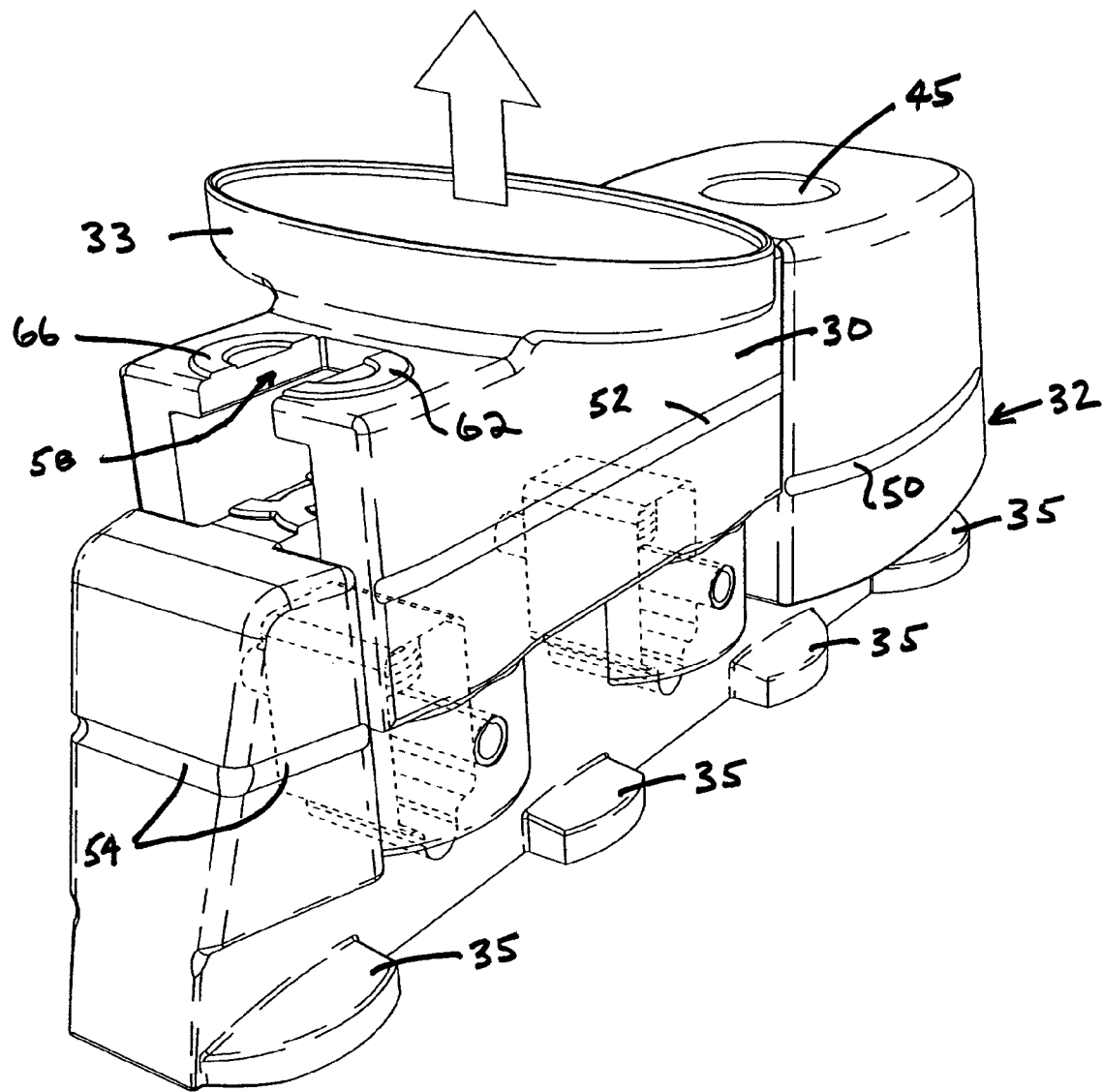
FIG. 12 is an assembled isometric view of the device of FIG. 11 in a retracted position.
Figure 13:
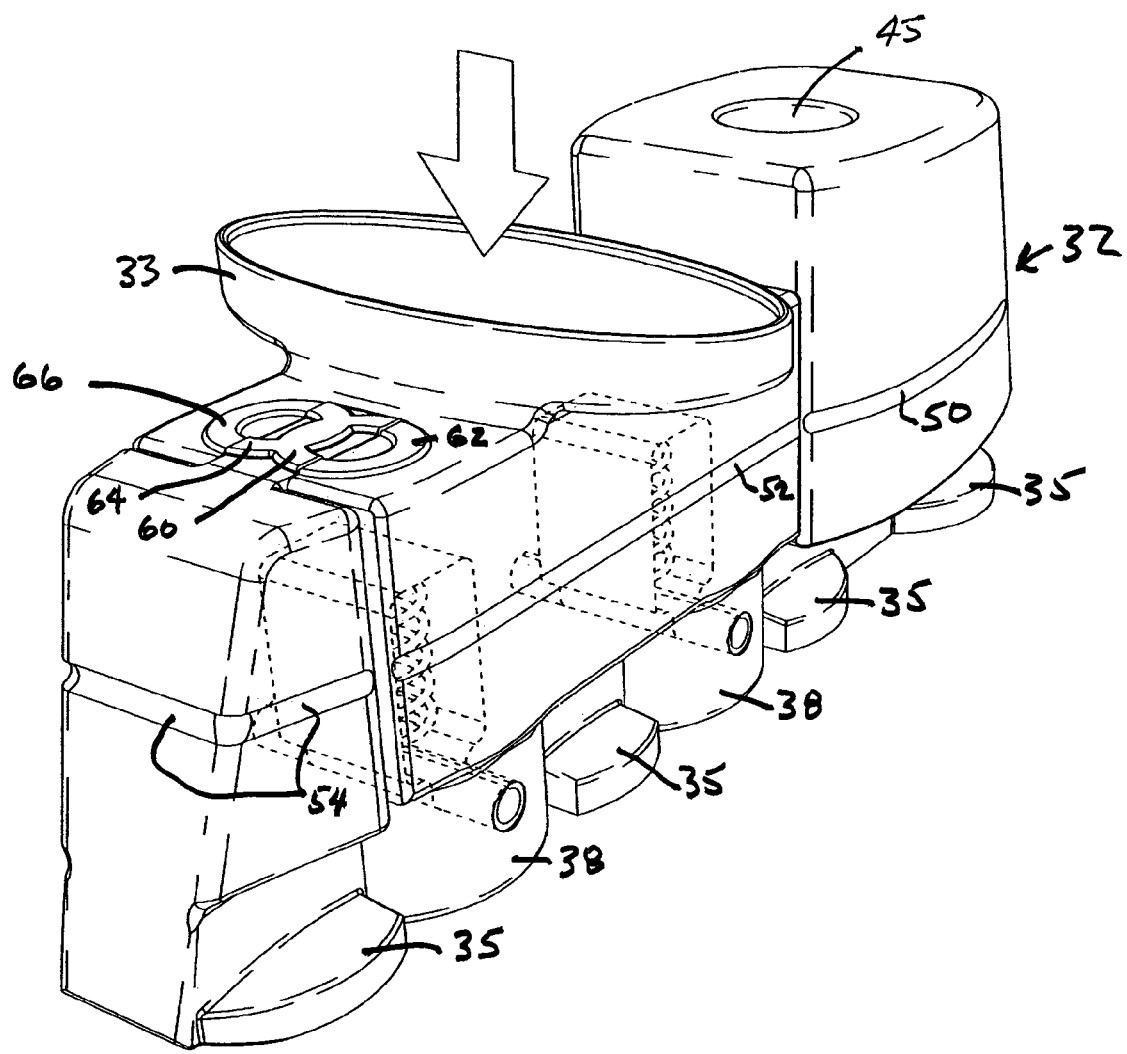
FIG. 13 is an assembled isometric view of the device of FIG. 11 in a extended position.

FIGS. 11, 12 and 13 show a particularly useful double plunger fitting 37 comprising an anchor 32 and a plunger 30. In the exploded view of FIG. 11, the posts 38 on the lower part of the plunger 30 are spring biased or urged in the downward direction by springs 38 and 39. Upon assembly, the springs 38 and 39 are in spring housings 46 and 47, respectively, and pins 40 and 41 extend through the openings 42, 43 and 44 in the posts 38 (and one not shown in a fourth post). A plurality of lugs 35 extend laterally from the base of the anchor 32, and the plunger 30 is urged to an extended position (FIG. 13) in which the posts 38 are adjacent to the lugs 35. When the knob 33 is lifted (as shown in FIG. 12), the plunger may be brought into a second or retracted position in which the plunger 30 is raised against the forces supplied by the springs 38 and 38. A threaded hole 45 is formed in the upper side of the anchor 32 for allowing some strap or hook or other tie-down to be attached to the anchor 32.

The fitting 37 of FIGS. 11-13 contains two separate forms of visual indicia that the plunger 30 is at least approximately in its extended position. Having at least one form of visual indicia will provide an installer with visual feedback that the fitting is locked into a track. It is not necessary to have two forms of indicia on any particular fitting; in most instances a single form of visual indicia will be sufficient. Two forms of indicia are shown in FIGS. 11-13 is simply for the purpose of eliminating duplicative drawings herein, and two show two examples in a single device. Obviously, a fitting could be made with only one of these forms of indicia (or another form).

In order to prevent or restrict the lugs from being lifted out of the circular openings in a track (see reference numeral 3 in FIG. 4) the anchor should be translated or shifted to a position in which the lugs 35 can enter the openings in the track between the narrowed sections thereof. Once the lugs 35 are in the track and moved to a position where they underlie the narrowed portions of upper side of the track, the posts 38 are pushed by the springs 38 and 39 into the openings 3 in the upper side of the track. The vertical height of the posts is such that the posts prevent the fitting from shifting or translating to a position wherein the lugs 35 can be lifted upwardly through the openings 3 and out of the track.

However, dirt and other debris can interfere with the operation of the plunger, and in particular can prevent the posts 38 from fully engaging the openings 3 in the track. Dirt and debris get into the channel that is formed by the track, and the posts 38 may not be able to extend into the track enough to sufficiently prevent shifting or translation of the anchor. Since the anchor sits very low-to-the-ground, it may be difficult for an installer to visually detect whether the posts are in the openings 3 and also may be difficult to determine the extent to which the plunger is in extended position.

To assist an installer in determining whether the anchor is sufficiently installed, a groove or line segment 50 is place on the rear (or right) side of the anchor, as shown in FIGS. 11-13. Similarly a line segment or groove 54 on the front (or left) side of the anchor 32 is at the same elevation as the groove 50, and is a continuation of the line or groove 50. A third line segment or groove is on the exterior of the plunger 30, such that when the plunger 30 is in its fully extended position, as shown in FIG. 13, the line segments are in alignment. Alignment, or at least approximate alignment, of the grooves or line segments 50, 52 and 54 provides an installer of the fitting 37 with a visual indication or indicia that the anchor will not translate to a position that would allow the lugs to exit or lift out of the openings 3 in the track.

The fitting 37 of FIGS. 11-13 also include an alternative or second form of visual indicia of a safe installation of the anchor in a track. A bar 56 is formed on an upper surface of the anchor. The bar 56 fits into a slot 58 on the one end of the plunger 30. The bar 56 contains two overlapping half-circles 60 and 64 in form of raised formations. The portions of the plunger 30 on opposite sides of the slot 58 also have raised formations in the form of half-circles 62 and 66. To indicate to an installer that a safe insertion of the anchor 32 into a track has occurred, the four half-circles 60,62, 64 and 66 will align to form two full overlapping circles. In particular, when the plunger is at least approximately its extended position, the half circle 60 will be adjacent to the half-circle 62 to form a first circle, and the half-circle 64 will align with the half-circle 66 to form a second circle. The two-overlapping circles serving as indicia of a generally safe installation can be seen in FIG. 13.

To increase the visual impact of the visual indicia represented by the lines 50, 52 and 54 and/or the half-circles 60, 62, 64 and 66, these geometric shapes can be painted or otherwise provided with color or high contrast appearance to make it easier to see the registration of the shapes, signifying a corresponding registration of the posts 38 in the openings of a track. It is also beneficial to have the shapes, i.e., the lines 50, 52 and 54 and/or the half-circles 60, 62, 64 and 66 be made a physical part of the anchor and plunger components, and not merely painted on the surface of those components, since the anchor and plunger are used in high-traffic environments, where mere surface applications could wear away. By making the shapes forming the indicia in the form of grooves or raised formations, the possibility of their wearing away is minimized.

Figure 14:
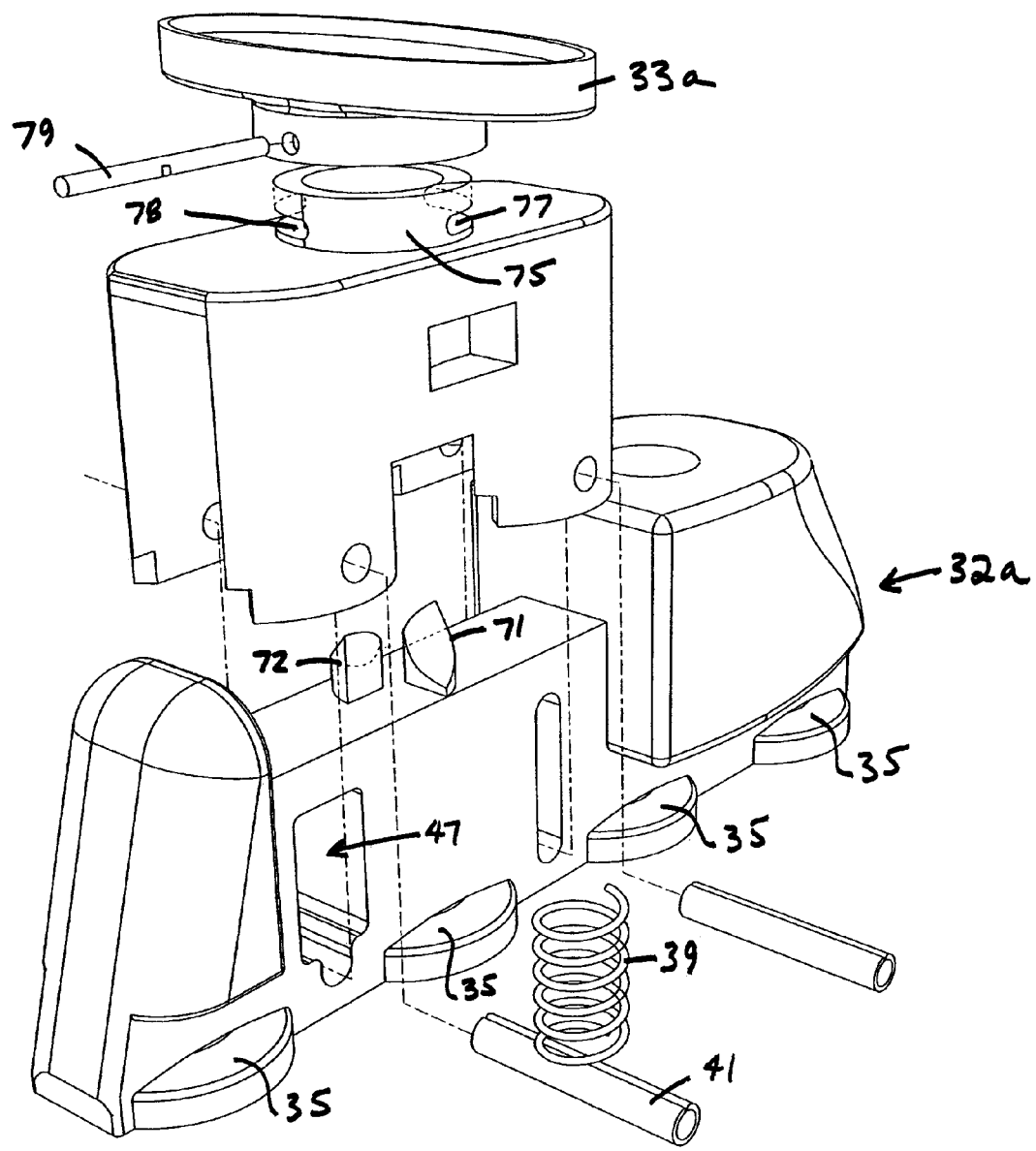
FIG. 14 is an exploded isometric view of an embodiment of a track fitting with visual indicia in the form of a rotating knob.
Figure 15:
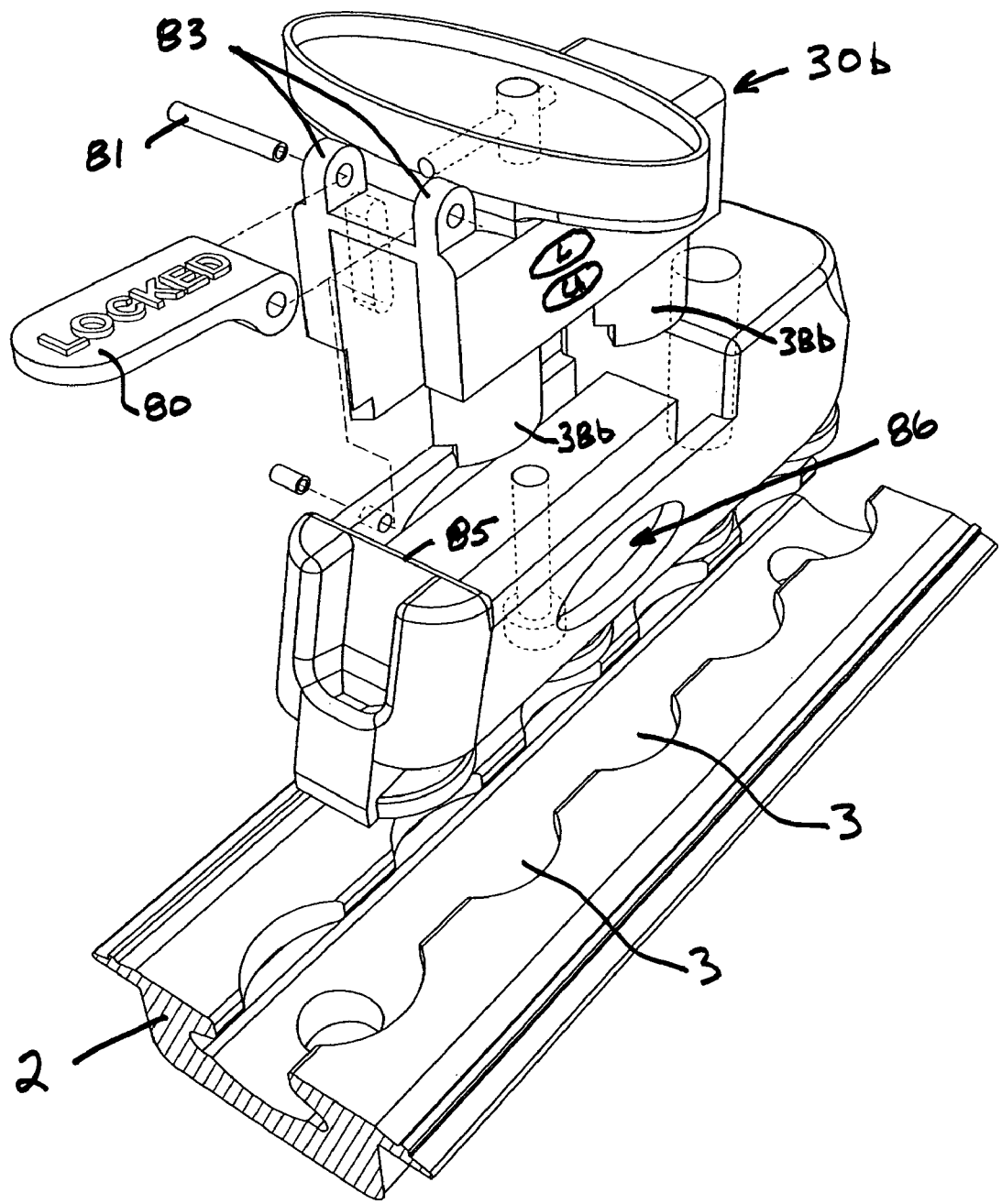
FIG. 15 is an exploded isometric view of an embodiment of a track fitting with visual indicia in the form of a displaceable tab.

FIGS. 14 and 15 represent alternative embodiments of indicia showing the registration of the posts 38 into corresponding grooves in the installation of an anchor and fitting as described herein. In FIGS. 14 and 15, the indicia is provided by moving parts that are beyond the moving parts that comprise the basic components of the plunger and anchor. This is in contrast to the embodiments of FIGS. 5 and 11-13 in which indicia is provided without using moving parts beyond the components of the plunger and anchor.

FIG. 14 shows an anchor 32*a* with two pegs 71 and 72 with oppositely facing sloped surfaces that serve as a cam to turn a knob 33*a*. The rotational position of the lifting knob 33*a* provides a visual indicia that the plunger is in either the retracted or the extended position. The lifting knob 33*a* is allowed to rotate within a collar 75. A pin 79 extends through elongated slots 77 and 78 in the collar such that when the plunger 30*a* is brought into its retracted position, the knob 33*a* is free to rotate, but when the plunger 30*a* is in its extended position, the lower portion of the collar (not shown) forces the knob 33*a* into a different position, for example one in which the longitudinal axis of the oval knob 33*s* is aligned with the longitudinal axis of the anchor 32*a*.

FIG. 15 is an exploded view of another embodiment of a fitting having visual indicia that posts on a plunger have engaged a track, and that the plunger is in its extended position. In the embodiment of FIG. 15, the plunger 30*b* fits into an anchor 32*b*. A tab 80 is mounted on one end of the plunger 30*b*. A pin 81 used to connect the tab 80 to two mounts 83. When the plunger 30*b* is in its upper or retracted position, the tab is in a vertical or hanging configuration. However, when the plunger 30*b* is in its downward or extended position, the tab 80 is pushed by the ledge 85 on the anchor 32*b* into a horizontal and more readable position to signal to an installer that the posts 38*b* are engaged in the openings 3 in track 2. In addition to the tab 80 with the word "LOCKED" imprinted with raised formations of letters, the letters "L" for locked and "U" for unlocked are carried by the side of the plunger such that in the extended position, the plunger 30*b* will display the letter "L" through the window 86 on the side of the anchor 32*b*, and in the retracted position the plunger 30*b* will display the letter "U" through the window" 86. As with the embodiment of FIGS. 11-13, the fact that two kinds or forms of indicia are shown in the embodiment of FIG. 15 is not intended to imply that two forms of indicia are needed or required. The two forms of indicia in FIG. 15 are intended to be alternatives, either one of which, or any of the others shown or suggested herein, may be quite sufficient in any particular application or environment.

In various of the embodiments described above, some form of connector (e.g., threaded hole 45 in FIGS. 11-13) is shown for purposes of allowing some device, such as a restraining belt or hook to be attached to the anchor. The restraint may be for purposes of holding a wheelchair or perhaps cargo of some kind in place during transportation of people or goods. In some instances the connector may be a male connector, such as a threaded bolt. In other instances, the anchor may be equipped with a female connector, such as a threaded hole for receiving a bolt. In yet other instances, a mere unthreaded opening for receiving a hook may be formed in the anchor to serve as a connecting means.

While particular embodiments of the inventions claimed herein have been shown in considerable detail, these embodiments are not intended to define the scope of the appended claims. Rather, numerous alternatives, modifications and revised forms of the claimed inventions will occur to persons of ordinary skill in the relevant art upon review of the foregoing specification, read in conjunction with the drawing figures. All such alternatives, modification and revised forms are intended to be covered by the claims.

The invention claimed is:

1. A track fitting comprising:
   an anchor with at least one track engaging lug extending from a lower part of the anchor;
   a plunger carried by the anchor, the plunger having at least one post;
   the plunger being moveable between an extended position and a retracted position;
   the plunger in the retracted position allowing insertion and translation of the lug of the anchor in a track;
   the plunger in the extended position being such that the at least one post is in registration with an opening in the track to restrict translation of the anchor and restrict removal of the anchor from the track;
   visual indicia on outer portions of the anchor and the plunger defining a visual confirmation that the plunger is at least approximately in its extended position locking the anchor in the track;
   wherein the indicia is in the form of complimentary portions of a geometric shape on exterior parts of the anchor and plunger, whereby alignment of the complimentary portions completes the geometric shape to indicate that the plunger is at least approximately in its extended position locking the anchor in the track;
   wherein the geometric shape is at least one line extending across both the plunger and the anchor such that when the plunger is at least approximately in its extended position the line is generally continuous and a segment of the line on the plunger is in at least general alignment with a segment of the line on said anchor; and, wherein the line is in the form of a groove cut from a surface of the plunger and from a surface of the anchor.

2. A track fitting comprising:

an anchor with a plurality of track engaging lugs extending from a lower part of the anchor;

a connector on the anchor for attaching a device to the anchor;

a plunger carried by the anchor, the plunger having at least one post;

the plunger being moveable between an extended position and a retracted position;

the plunger in the retracted position allowing insertion and translation of the lugs of the anchor in a track;

a spring urging the plunger from its retracted position toward its extended position;

the plunger in the extended position being such that the at least one post is in registration with an opening in the track to restrict translation of the anchor and restrict removal of the anchor from the track;

visual indicia on an outer portion of the fitting providing a visual confirmation that the plunger is at least approximately in its extended position locking the anchor in the track, the visual indicia providing confirmation of at least approximate registration of the post of the plunger into the track without using moving parts other than the components of the plunger and anchor;

wherein the indicia is in the form of complimentary portions of a geometric shape on exterior parts of the anchor and plunger, whereby alignment of the complimentary portions completes the geometric shape to indicate that the plunger is at least approximately in its extended position locking the anchor in the track; and, wherein the geometric shape is at least one line extending across both the plunger and the anchor such that when the plunger is at least approximately in its extended position the line is generally continuous and a segment of the line on the plunger is in at least general alignment with a segment of the line on said anchor.

3. A track fitting comprising:

an anchor with a plurality of track engaging lugs extending from a lower part of the anchor;

a connector on the anchor for attaching a device to the anchor;

a plunger carried by the anchor, the plunger having at least one post;

the plunger being moveable between an extended position and a retracted position;

the plunger in the retracted position allowing insertion and translation of the lugs of the anchor in a track;

a spring urging the plunger from its retracted position toward its extended position;

the plunger in the extended position being such that the at least one post is in registration with an opening in the track to restrict translation of the anchor and restrict removal of the anchor from the track;

visual indicia on an outer portion of the fitting providing a visual confirmation that the plunger is at least approximately in its extended position locking the anchor in the track, the visual indicia providing confirmation of at least approximate registration of the post of the plunger into the track without using moving parts other than the components of the plunger and anchor;

wherein the indicia is in the form of complimentary portions of a geometric shape on exterior parts of the anchor and plunger, whereby alignment of the complimentary portions completes the geometric shape to indicate that the plunger is at least approximately in its extended position locking the anchor in the track; and, wherein the anchor has at least four lugs, two of the at least four lugs being disposed on a first side of the anchor and two of the at least four lugs being disposed on a second side of the anchor, and the plunger has at least four posts, two of the at least four posts being disposed on a first side of the plunger and two of the at least four posts being disposed on a second side of the plunger.

* * * * *